United States Patent [19]

Moore, deceased et al.

[11] 4,036,327
[45] July 19, 1977

[54] AIR LINE LUBRICATOR WITH SAFETY DEVICE

[76] Inventors: Robert M. Moore, deceased, late of Englewood, Colo.; by Bette J. Moore, personal representative, 4695 S. Jason, Englewood, Colo. 80110

[21] Appl. No.: 647,344

[22] Filed: Jan. 8, 1976

[51] Int. Cl.² .......................... F01M 1/08; F16N 7/32
[52] U.S. Cl. .............................. 184/55 A; 184/103 A
[58] Field of Search .................... 184/55 A, 103 A; 137/101.11, 205, 205.5, 248, 564.5

[56] References Cited

U.S. PATENT DOCUMENTS

| 2,784,735 | 3/1963 | Barr et al. | 137/448 |
|---|---|---|---|
| 3,083,724 | 4/1963 | Johnson | 137/448 |
| 3,447,562 | 6/1969 | Hoffman | 184/103 A |
| 3,805,922 | 4/1974 | Moore | 184/55 A |
| 3,945,392 | 3/1976 | Deutow et al. | 137/205 |
| 3,958,663 | 5/1976 | Moore | 184/103 A |

Primary Examiner—Samuel W. Engle
Assistant Examiner—S. A. Cangialosi

Attorney, Agent, or Firm—Bertha L. MacGregor; Kyle W. Rost

[57] ABSTRACT

An air line lubricator with safety device for automatically actuating an air actuatable member located outside of the lubricator. The air actuatable member may be a valve which controls a tool, or a signal which indicates that the oil level in the lubricator bowl has fallen below a predetermined level. The lubricator bowl contains oil and pressurized air and an air tube which receives pressurized air from the bowl when the oil level is below a predetermined level. The air tube has a relatively small intake end opening and a relatively wider internal diameter. An oil level controlled member may be a float or a float controlled piston which is movable relatively to said tube opening and is supported by the oil when the oil level is above a predetermined level. The face of the oil level controlled member has mounted thereon a tiltable member for engagement by the air tube open end. A vibration coating is applied to said tiltable member to maintain its sealing engagement with the air tube open end when the oil is above said predetermined level.

7 Claims, 5 Drawing Figures

AIR LINE LUBRICATOR WITH SAFETY DEVICE

BACKGROUND OF THE INVENTION

1. Field of the Invention

The invention relates to a safety device for air line lubricators designed for tool maintenance and for giving a signal when the oil in the lubricator bowl falls below a predetermined level. In two known embodiments, the safety device employs a float or a float controlled piston in the lubricator that controls the opening of an air tube which receives air from the lubricator bowl and conveys the air through its outlet end outside of the lubricator to a valve or a signal to be activated. The present invention relates to improvement of the shape of the intake end of the air tube, to a tilting device for unsealing the air tube, and to a coating on the tilting device, or on the float or the float controlled piston for minimizing the effect of vibration on the tube sealing function of the tilting device, the float or float controlled piston

2. Description of the Prior Art

Applicant's prior U.S. Pat. No. 3,805,922, issued Apr. 23, 1974, describes the basic air line lubricator safety device for tool maintenance and for actuating a signal when the oil level in the lubricator falls below a predetermined level; and his pending application, Ser. NO. 541,200, Now U.S. Pat. No. 3,958,663, issued May 25, 1976, describes a modification of the invention. In both embodiments, an air tube having an inlet opening for receiving compressed air from the lubricator bowl and an outlet opening for conveying the air to a valve or signal outside of the lubricator, is either opened or sealed in response to the movement of the oil level controlled member, namely, a float or a float controlled piston. An expanded range of applications for the use of applicant's described devices has resulted in the improvements disclosed herein.

The prior art teaches an air tube of uniform diameter bore sealed by a sealing member such as a float or a float controlled piston contacting the air intake opening of the tube when the oil level is above a predetermined level. When the oil level in the lubricator drops, the piston or float drops away from the tube opening, thus allowing pressurized air in the lubricator bowl to enter the air tube for its intended functions. However, when heavy oils are used in the lubricator bowl, or when the lubricator and associated equipment are required to employ higher than average air pressure, the described prior art devices do not perform their intended functions as efficiently as they do when light weight oils are used in the lubricator and when average or lower air pressures are required for operation of the mechanism associated with the prior art lubricators. When heavy oils are used in the prior art devices, and a small quantity has worked its way into the tube, the heavy oil clogs the tube due to capillary attraction great enough to prevent passage of the pressurized air from the bowl through the air tube. Further, the use of the lubricator in equipment utilizing higher than average high pressure air increases the attractive force between the air tube inlet end and the sealing member to such a degree that the sealing member (float or float controlled piston) may be held against the tube opening and prevent signal activation even when the oil level in the bowl has dropped below a predetermined level and the safety devices outside of the lubricator should function.

SUMMARY OF THE INVENTION

This invention overcomes the objections to prior art devices and provides an expanded range of usefulness both with respect to the weight of oils which may be used in the lubricator and the air pressures that may be used in the equipment and associated lubricator to which the invention is applied. The invention also is designed to create a better seal between the intake end of the air tube and the sealing member so that the tube will not leak air to the outside signal devices due to vibration in the equipment to which the lubricator is attached. The addition of a tilting device on the surface of the sealing member adds weight for pulling the member away from the tube opening and also provides lever action applying the weight to gain mechanical advantage in opening the tube at the proper time determined by the oil level.

The main object of the invention is to expand the usable range of the safety device in lubricators using heavy oils and with equipment employing high pressure air, or both. Another important object is to eliminate leaking caused by vibration in the seal between the sealing member and the intake end of the air intake-outlet air tube.

DESCRIPTION OF THE PREFERRED EMBODIMENT

Figure 1:
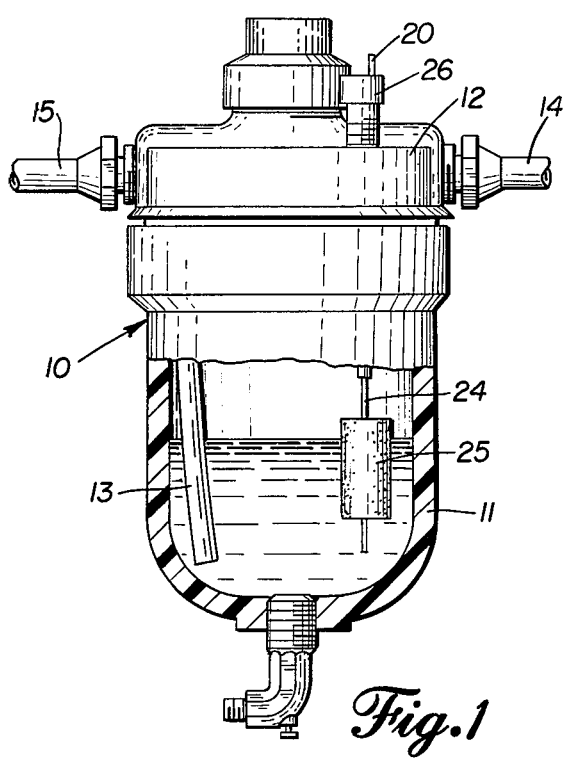
FIG. 1 is an elevational side view, partly in section, of an air line lubricator safety device provided with a float controlled piston in the lubricator housing head for alternately opening and closing the air intake end of an air tube, embodying the invention.
Figure 2:
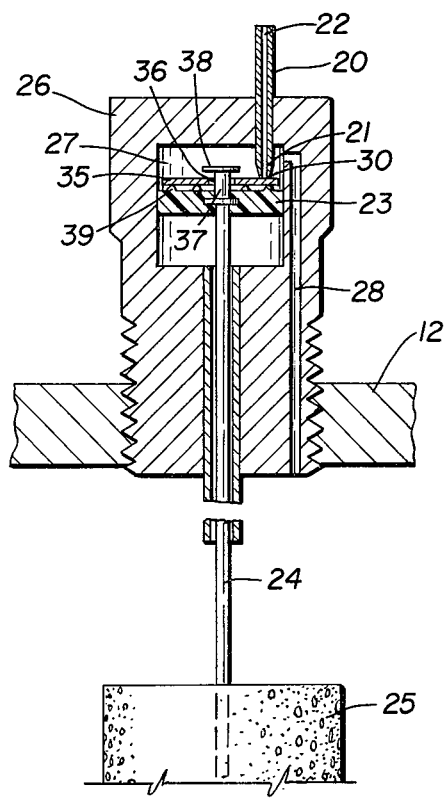
FIG. 2 is a vertical sectional view in a plane extending through the float and float controlled piston of FIG. 1 on an enlarged scale.

Referring to FIGS. 1 and 2, the lubricator 10 comprises an oil holding bowl 11, head 12, and oil feeder tube 13 through which oil is fed to an air line 14. The air line 15 conveys high pressure air to the bowl 11.

The safety device of FIG. 1 and 2 comprises an air tube 20 for carrying pressurized air from the oil bowl 11 to an outside signal device (not shown) to warn that the oil level in the lubricator 10 is below a predetermined level. The air tube 20 has an air intake end 21 and an outlet end 22 which leads to the signal device (not shown). A piston 23 is connected by a stiff wire 24 to an oil level controlled float 25. The described parts 20–23 are located in the auxilliary head 26 above the head 12. The air chamber 27 above the piston 23 communicates with the pressurized air in the bowl 11 by means of the air passageway 28.

The improvement which permits use of heavy oils as well as light oils in the lubricator of this invention comprises the relatively small internal diameter tip 30 at the intake end 21 of the air tube 20. For example, in an air tube having an internal diameter of 0.047 inch, the tip 30 internal diameter is 0.014 inch. The larger internal diameter of the tube 20 is designed to provide a wide passage for air that will not become clogged if heavy oil, for example greater than 10 weight, enters the tube and is drawn into the tube by capillary attraction, while the smaller internal diameter of the tip 30 provides a small opening easy to seal even when the lubrcator is subject to vibration. The cohesion within the oil and the adhesion of the oil to the tube walls can form a mass that air cannot displace under the pressures used in the lubricator if the entire tube were as narrow as the diameter of the opening 30. However, by utilizing the small opening at the tip and the broader diameter of the remainder of the tube 20, the easy sealability of the small diameter is combined with the capacity of the tube to operate with oils of greater than 10 weight.

The tube 20 may be sealed by the piston 23 which is movable to open said tube in response to movement of the float 25 when the oil falls below a predetermined level. However, when exceptionally high pressure air, for example 200 psi. is used in the apparatus of which the lubricator is a part, the attraction of the piston 23 (the oil level controlled member) for the tube opening 30 caused by the pressure differential between the oil bowl and the tube which is typically at atmospheric pressure, may be great enough so that the piston cannot directly pull away from the tube end 30. To overcome this condition, a disc 35 is loosely attached to the piston 23. The central mounting hole 36 is large enough to allow the disc to tilt without being restrained by the pin 37. The diameter of the annular rim 38 of the pin 37 is greater than the diameter of the hole 36, and the shaft of the pin 37 is smaller than the hole 36. The precise dimensions of the parts may vary according to the point where the disc 35 contacts the tip 30 of the tube 20 and the air pressure used in the lubricator. One generally functional combination is a disc of one inch diameter having a mounting hole of approximately ¼ inch, a mounting pin with a shaft diameter of approximately ⅛ inch and a rim diameter of approximately 5/16 inch, and an exposed portion of the pin between the rim and the piston of approximately ⅛ inch. The disc 35 is supported by a plurality of nubs 39 which prevent the lower surface of the disc 35 from contacting the upper surface of the piston 23, thereby preventing adhesion between said surfaces such as might prevent the disc from tilting relatively to the piston surface.

Figure 3:
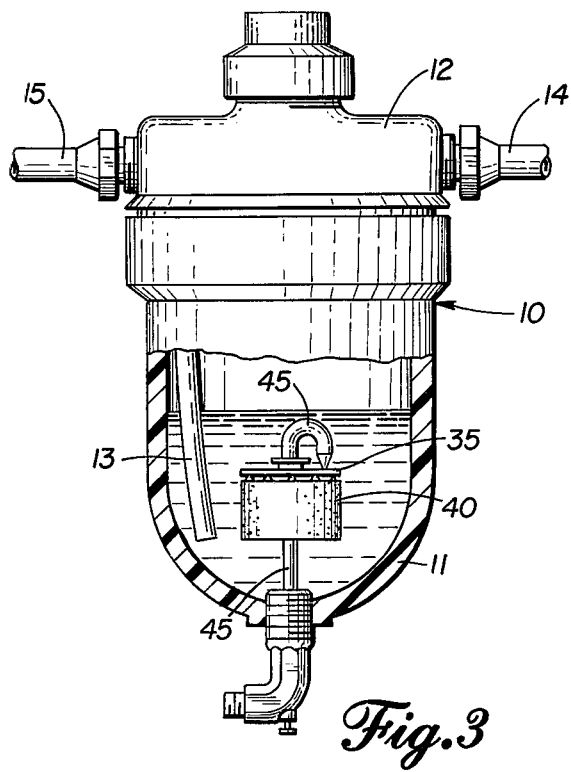
FIG. 3 is an elevational side view, partly in section, of an air line lubricator safety device provided with a float for alternately opening and closing the air intake end of an air tube, embodying the invention.
Figure 4:
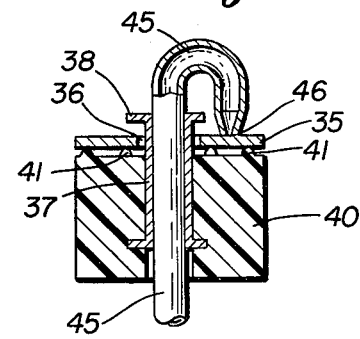
FIG. 4 is a vertical sectional view, on an enlarged scale, of part of the air tube and float of FIG. 3, showing the float and tilting device in the positions they assume when the oil level is above its predetermined lever and the float and tilting device are in the air tube closing positions.
Figure 5:
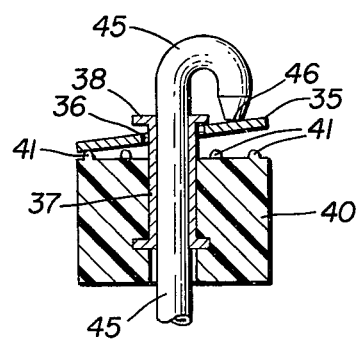
FIG. 5 is a view similar to FIG. 4, showing the float and tilting device in the positions they assume when the oil level is below a predetermined level and the float and tilting device are in the air tube opening positions.

Referring to the embodiment of the invention shown in FIGS. 3–5, parts similar to those heretofore described by reference to FIGS. 1 and 2 have been similarly designated. Instead of using a float controlled member such as the piston 23 for opening and closing the air tube 20, the embodiment of FIGS. 3–5 employs a float 40 with nubs 41 on its upper surface, and uses the previously described disc 35, pin 37 with rim 38. This combination of parts functions to alternately open and close an air tube 45 with tip 46 having a smaller internal diameter than that of the rest of the tube.

A coating of soft durometer plastic material is applied to the disc 35 in both embodiments of the invention to provide a vibration-resisting contact between the disc and the end 46 of the tube 45. If the disc 35 and nubs 39 or 41 are omitted, as they may be in low air presure apparatus, the plastic coating is applied directly to the upper surface of the piston 23 or to the upper surface of the float 40. An example of suitable plastic material for the purpose stated is known as poly-tape SJ 8561 manufactured by 3 M Company.

I claim:

1. An improved air line lubricator safety device for use in a lubricator having an oil bowl containing oil and pressurized air and means feeding oil to an air line leading to an air operated device, the safety device being of type having an air tube mounted in the lubricator and an oil level controlled member moveable relatively to the end of the air tube, said member being supported by the oil to seal the air tube when the oil level is above a predetermined level and the air tube being opened when the oil falls below said predetermined level, allowing air to escape the oil bowl and actuate a signal device located outside the lubricator, the improvement comprising:

a. said oil level controlled member having a tiltable member mounted on its upper side for sealingly contacting the air tube when the oil level is above said predetermined level, and for tilting with respect to the upper side of the oil level controlled member to progressively open the air tube as the oil falls below said predetermined level; and b. said air tube having a relatively small orifice sealingly contacted by said tiltable member and having a relatively larger interior bore, the small orifice providing superior sealing against air and oil leaks under conditions of vibrations and pressurized atmosphere within the lubricator, and said relatively larger interior bore of tube preventing the air tube from becoming clogged with particles of heavy oil from the lubricator bowl.

2. The device defined by claim 1 wherein said tiltable member is mounted loosely and symmetrically on the oil level controlled member between said member and the air tube orifice for unsymmetrically engagement by said tube orifice, sealing the orifice against pressure within the lubricator bowl.

3. The device defined by claim 1, in which the tiltable member has a coating of soft durometer material applied to the surface facing the air tube orifice sealing the orifice when the oil level is above a predetermined level.

4. The device defined by claim 1, in which the oil level controlled member is a float in the oil bowl of the lubricator and the tiltable member is mounted on the float.

5. The device defined by claim 1, in which the oil level controlled member is a float actuated piston slidable in a piston chamber in the head of the oil bowl of the lubricator and the tiltable member is mounted on the piston.

6. The device defined by claim 1, in which the tiltable member is a washer having a central hole, a pin of smaller diameter than the center hole of said washer and passing through said central hole and mounted on said oil level controlled member, said pin having an annular rim of greater diameter than said center hole.

7. The device defined by claim 6, in which the oil level controlled member has a plurality of nubs on its surface facing the tiltable member.

* * * * *